(12) United States Patent
Weinberger et al.

(10) Patent No.: US 8,476,778 B2
(45) Date of Patent: Jul. 2, 2013

(54) ENERGY GENERATOR

(75) Inventors: Marvin Weinberger, Havertown, PA (US); Michael Balsamo, San Francisco, CA (US)

(73) Assignee: MIW Associates, LLC, Havertown, PA (US)

( * ) Notice: Subject to any disclaimer, the term of this patent is extended or adjusted under 35 U.S.C. 154(b) by 417 days.

(21) Appl. No.: 12/720,662

(22) Filed: Mar. 9, 2010

(65) Prior Publication Data

US 2010/0253088 A1   Oct. 7, 2010

Related U.S. Application Data

(60) Provisional application No. 61/158,550, filed on Mar. 9, 2009.

(51) Int. Cl.
| F03B 13/10 | (2006.01) |
| F03B 13/12 | (2006.01) |
| H02P 9/04  | (2006.01) |

(52) U.S. Cl.
USPC .......................................................... 290/42

(58) Field of Classification Search
USPC ............................ 290/54, 42, 43, 53, 44, 55
See application file for complete search history.

(56) References Cited

U.S. PATENT DOCUMENTS

| 3,524,196 A | 8/1970 | Church et al. |
| 3,727,396 A | 4/1973 | Hetzel |
| 3,840,760 A | 10/1974 | de Boer |
| 3,898,732 A | 8/1975 | Krainer |
| 3,906,263 A | 9/1975 | Chen et al. |
| 3,938,754 A | 2/1976 | Stephenson et al. |
| 4,008,566 A | 2/1977 | McClintock |
| 4,096,638 A | 6/1978 | Schimming |
| 4,352,023 A | 9/1982 | Sachs et al. |
| 4,387,318 A | 6/1983 | Kolm et al. |
| 4,392,092 A | 7/1983 | Gassner |
| 4,460,854 A | 7/1984 | Bauer |
| 4,494,023 A | 1/1985 | Cook |
| 4,583,027 A | 4/1986 | Parker et al. |
| 4,852,350 A | 8/1989 | Krisko |
| 5,347,186 A | 9/1994 | Konotchick |
| 5,578,877 A | 11/1996 | Tiemann |
| 5,682,132 A | 10/1997 | Hiroyoshi et al. |
| 5,818,132 A | 10/1998 | Konotchick |
| 6,220,719 B1 | 4/2001 | Vetorino et al. |
| 6,345,789 B1 | 2/2002 | Rasmusson |
| 6,407,484 B1 | 6/2002 | Oliver et al. |
| 6,479,920 B1 | 11/2002 | Lal et al. |
| 6,737,829 B2 | 5/2004 | Sastry |
| 6,768,230 B2 | 7/2004 | Cheung et al. |
| 6,781,259 B2 | 8/2004 | Hente |
| 6,936,937 B2 | 8/2005 | Tu et al. |
| 6,984,902 B1 | 1/2006 | Huang et al. |
| 7,009,310 B2 | 3/2006 | Cheung et al. |
| 7,009,315 B2 | 3/2006 | Takeuchi |
| 7,081,693 B2 | 7/2006 | Hamel et al. |

(Continued)

FOREIGN PATENT DOCUMENTS

| WO | 2006/109033 | 10/2006 |
| WO | 2006/109037 | 10/2006 |

*Primary Examiner* — Javaid Nasri
(74) *Attorney, Agent, or Firm* — Duane Morris LLP

(57) ABSTRACT

Inertia driven energy harvesters including a movable arm, suspension system, gearing system, generator and energy distribution system. The energy harvesters enable the efficient capture and conversion of kinetic energy to electrical energy.

22 Claims, 16 Drawing Sheets

U.S. PATENT DOCUMENTS

| | | |
|---|---|---|
| 7,105,982 B1 | 9/2006 | Hagood, IV et al. |
| 7,157,835 B2 | 1/2007 | Sakai |
| 7,170,201 B2 | 1/2007 | Hamel et al. |
| 7,235,936 B2 | 6/2007 | Oba et al. |
| 7,239,038 B1 | 7/2007 | Zimmerman et al. |
| 7,239,052 B2 | 7/2007 | Chang et al. |
| 7,245,062 B2 | 7/2007 | Schmidt |
| 7,471,033 B2 | 12/2008 | Thiesen et al. |
| 7,649,305 B2 | 1/2010 | Priya et al. |
| 7,847,421 B2 * | 12/2010 | Gardner et al. ............... 290/1 R |
| 2005/0073913 A1 | 4/2005 | Born et al. |
| 2007/0152511 A1 | 7/2007 | Sakai et al. |
| 2007/0194634 A1 | 8/2007 | Roberts |
| 2007/0210580 A1 | 9/2007 | Roberts et al. |
| 2007/0278902 A1 | 12/2007 | Rastegar et al. |
| 2008/0048521 A1 | 2/2008 | Mabuchi et al. |
| 2008/0074002 A1 | 3/2008 | Priya et al. |
| 2008/0174120 A1 | 7/2008 | Gardner et al. |
| 2008/0217926 A1 | 9/2008 | Lemieux |
| 2008/0265692 A1 | 10/2008 | Roberts |
| 2008/0277941 A1 | 11/2008 | Bowles et al. |
| 2008/0303357 A1 | 12/2008 | Battlogg et al. |
| 2009/0121494 A1 | 5/2009 | Lemieux |
| 2009/0218824 A1 | 9/2009 | Freeland et al. |
| 2009/0322184 A1 | 12/2009 | Carman et al. |
| 2010/0033142 A1 | 2/2010 | Roberts et al. |

* cited by examiner

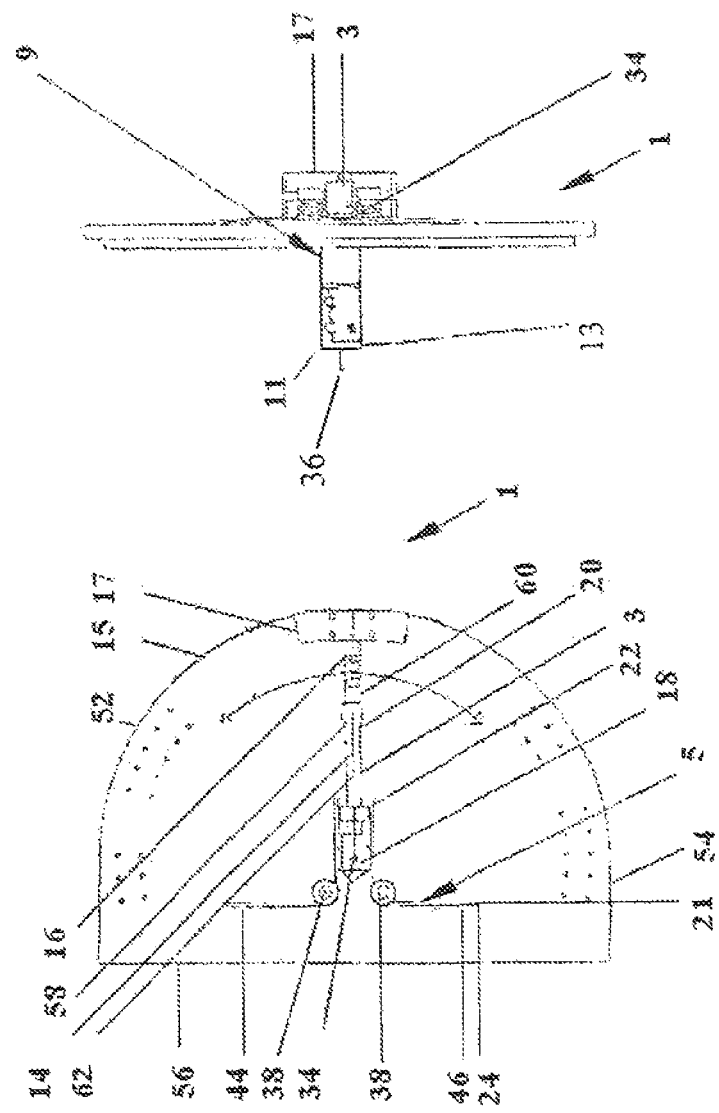

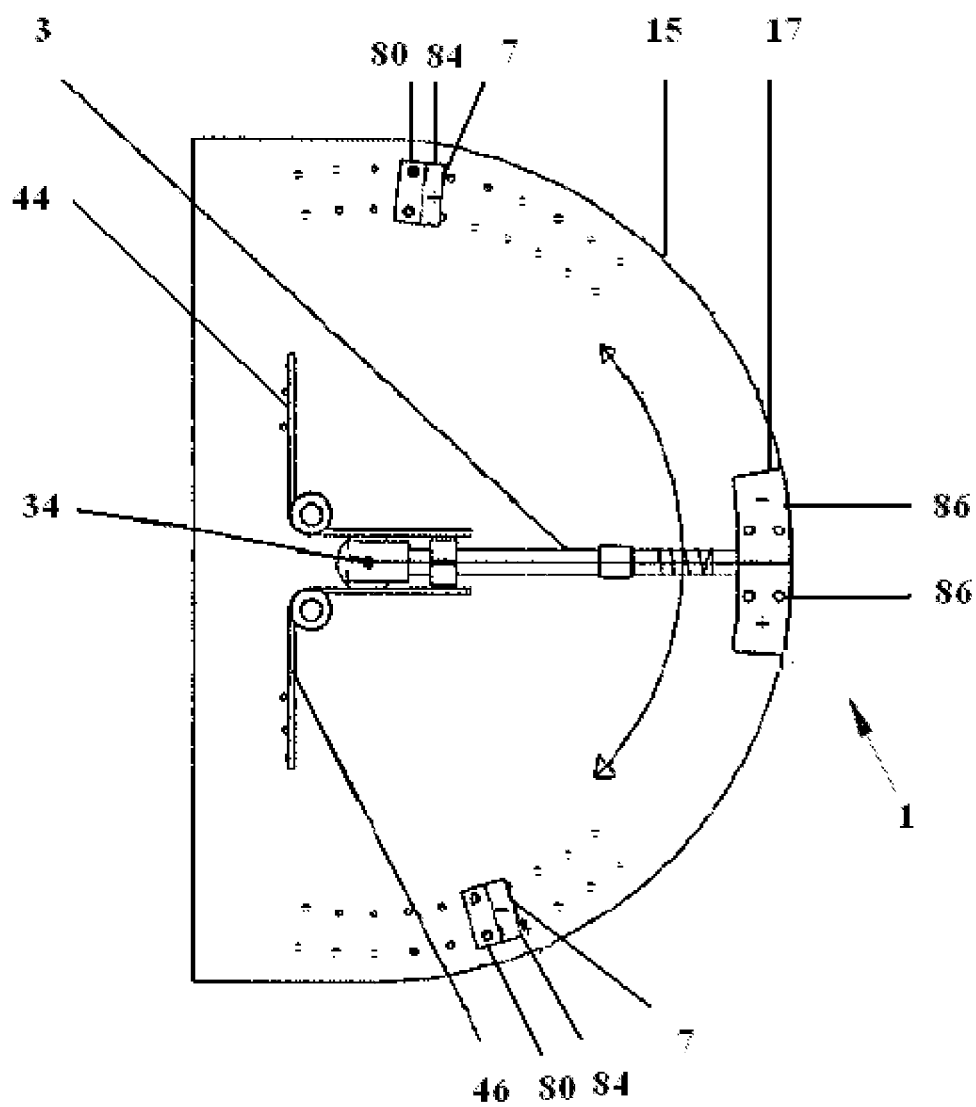

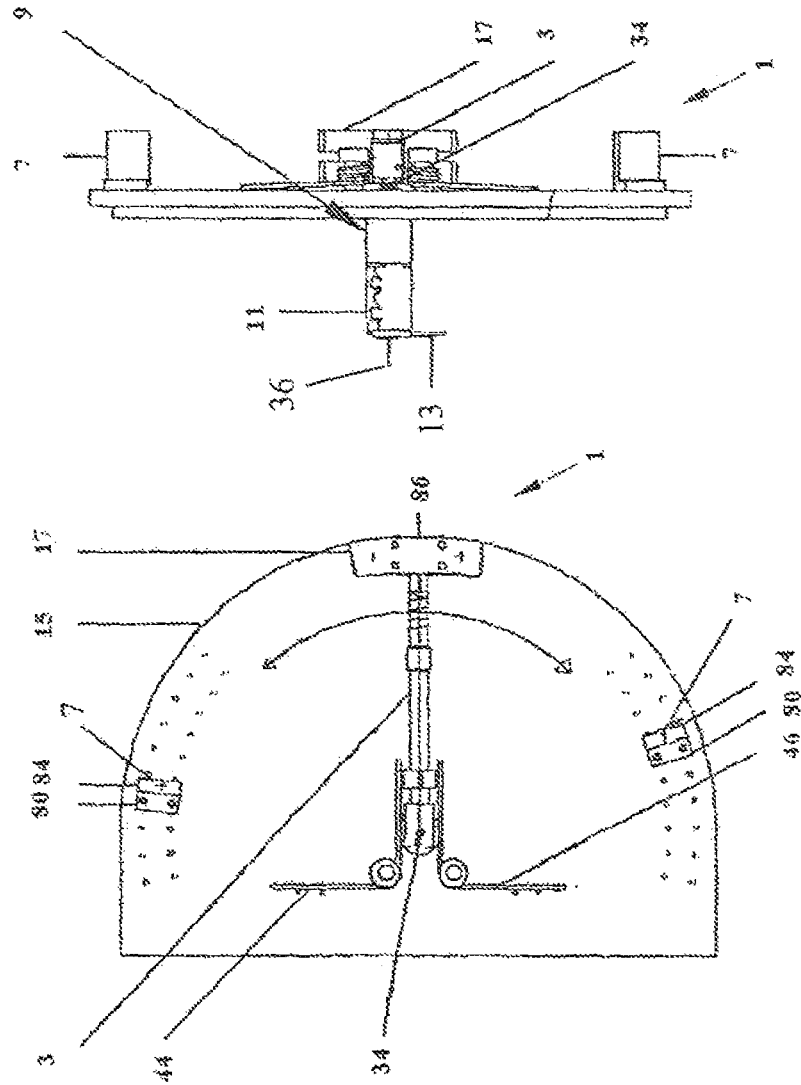

ENERGY GENERATOR

This application is a non-provisional of and claims benefit of priority to U.S. Provisional Patent Application No. 61/158, 550, filed on Mar. 9, 2009, the entire disclosure of which is incorporated herein by reference.

BACKGROUND OF THE INVENTION

1. Field of the Invention

This invention relates to the fields of inertia driven energy generators. In particular, the invention relates to energy generators that are capable of converting kinetic energy derived from motion due to a wide variety of sources, such as humans, animals, machines, wind and fluid flow, to electricity.

2. Description of the Related Technology

Current electromechanical energy harvesters do not efficiently harness the kinetic generated by low or variable frequency motions. Consequently, these energy harvesters are ineffective in capturing energy from passive motion, such as the vibrational energy generated by humans and dogs, which has a periodicity of about 1 to about 3 Hz.

For example, conventional piezoelectric cantilever energy harvesters are designed primarily to capture kinetic energy generated by high frequency motions. Conventional gravity driven mechanical energy harvesters that have rotating pendulums are limited to operation in environments where gravitational forces are present. Additionally, they are not designed to efficiently capture kinetic energy induced by low and variable frequency motion. Alternative electromechanical energy generators that utilize magnetic induction systems, such as shake flashlights, require forced mechanical movement in a specific direction and a long track length in order to generate a useful amount of electricity. Furthermore, these devices typically require the presence of a supplemental energy source.

In view of the limitations of the prior art, there exists a need for an efficient energy generator capable of effectively harnessing kinetic energy from low frequency, variable frequency and multidirectional motions and forces.

SUMMARY OF THE INVENTION

Accordingly, it is an object of certain embodiments of the invention to provide inertia driven energy harvesters for transforming kinetic energy to electrical energy. According to a first aspect of the invention, the energy harvester has a housing and an arm that is responsive to a force of a surrounding environment. A mass is attached to the arm. A bumper member restricts the motion of the arm. A spring is attached to and suspending an upper surface of said arm from the housing. The spring has a spring rate of about 0.01 Nm/Deg to about 5.0 Nm/Deg adapted for capturing low frequency vibrations of the surrounding environment. A gearing system is connected to the arm, and a generator is connected to the gearing system for transforming the kinetic energy of the arm to electricity.

In a second aspect, the energy harvester includes a housing and an arm responsive to a force of a surrounding environment. A mass is attached to said arm. A spring is attached to and suspending an upper surface of said arm from the housing. A gearing system and generator transforms the kinetic energy of the arm to electricity and provides an initial driving force to the arm to induce movement of the arm from an initial rest position.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1(a) is a schematic diagram of an exemplary embodiment of the energy harvester.

FIG. 1(b) is a side view of the energy harvester of FIG. 1.

FIG. 7(b) is a schematic diagram of an energy harvester including two magnetic bumpers and a mass with two magnetic elements.

FIG. 7(c) is a schematic diagram of an energy harvester including two magnetic bumpers and a magnetic mass with two polarized surfaces.

FIG. 7(d) is a side view of the energy harvester of FIG. 7(c).

DETAILED DESCRIPTION OF THE PREFERRED EMBODIMENT(S)

Figure 1C:
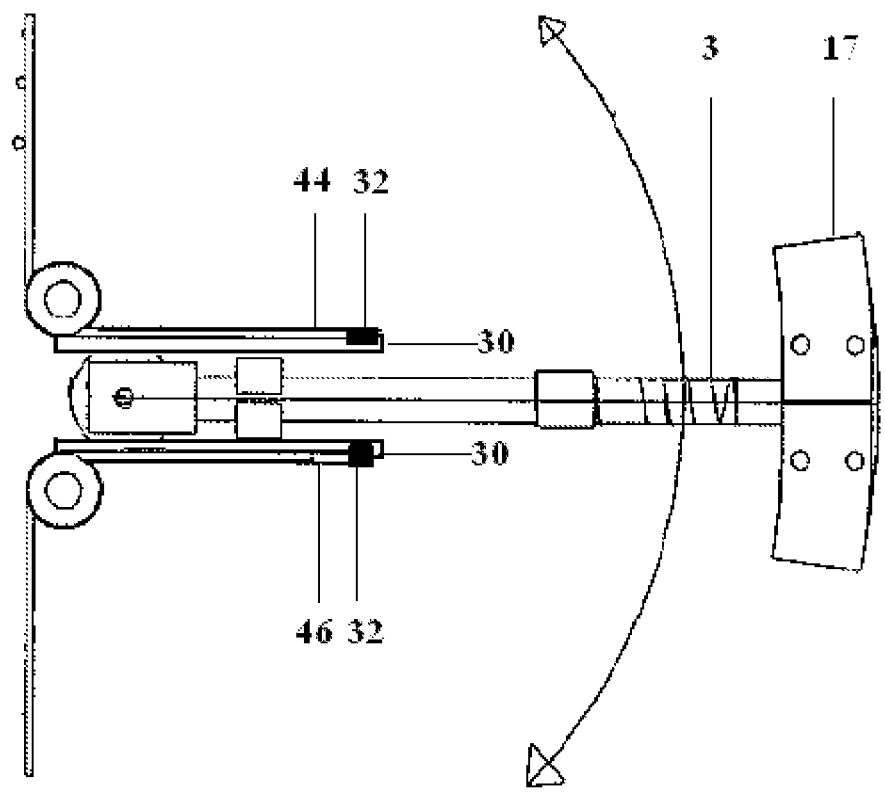
FIG. 1(c) is a schematic diagramming showing a close-up view of the suspension system of FIG. 1(a)

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. Thus, for example, reference to "an armature" includes a plurality of armature and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

Furthermore, unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

The present invention is directed to energy harvesters 1 driven by inertial forces. Specifically, the invention is directed to energy harvesters 1 driven by inertia to efficiently capture the kinetic energy produced by various forms of motions and forces of a surrounding environment, such as low frequency motions, high frequency motions and variable frequency motions, and combinations thereof. Energy harvesters 1 of the present invention are not dependent on gravitational forces to capture kinetic energy. Because it is driven by inertia, it can function in both the presence and absence of gravitational forces. The captured kinetic energy is converted into electricity, which is subsequently stored or used to power a wide variety of electrical devices.

Energy harvesters 1 are adapted to capture energy from a wide variety of environments. In one embodiment, energy harvesters 1 can be fixed or removably attached, either directly or indirectly, to any movable surface, such as a surface of a human, animal, machine, or structure movably responsive to an applied force, such as wind or fluid flow. Therefore, energy harvester 1 can be used to capture the kinetic energy derived from the motion of the movable structure. Alternatively, energy harvesters 1 can be mounted to a stationary surface that is subject to an applied force, such as wind and fluid flow. Exemplary stationary surfaces include a roof or the side of a building. In this embodiment, the applied force moves a component of energy harvester 1, enabling energy harvester 1 to capture the kinetic energy derived therefrom. In addition to harnessing energy from these surfaces and applied forces, energy harvester 1 can also dampen the underlying motion of the surface to which it is attached.

Referring now to the drawings, wherein like reference numerals designate corresponding structure throughout the views, and referring now to the first exemplary embodiment shown in FIGS. 1(a)-1(b), energy harvester 1 includes a movable arm 3 and suspension system 5 that tunes the resonance frequency of and allows for the zero load positioning of arm 3 in any orientation. Optionally, energy harvester 1 may further include a bumper member to restrain movement and/or support the resonance frequency of arm 3 by redirecting the angular momentum back toward the initial rest point, which will increase energy harvesting. A gearing system 9 and generator 11 relay and transform the kinetic energy of arm 3 into electrical energy, and an energy distribution system 13 stores and/or supplies the generated electricity to an electrical device. To protect and enhance the durability of energy harvester 1, the aforementioned components are enclosed within a housing 15.

Arm 3 has an elongated body 20 including a proximal end 18 hinged to a gearing system 9 and a distal end 16. Body 20 further includes an upper surface 58, lower surface 60 and side surface 62. Body 20 can have any shape, size or configuration adapted to induce movement, and thereby generating kinetic energy, in response to the motions or forces of an environment that act on arm 3. Exemplary environmental forces include gravitational forces, shock forces, vibrational forces, rotational forces, centripetal forces, centrifugal forces or combinations thereof. Responding to and harnessing energy from the vibrational motions and forces of an environment, arm 3 is capable of multiple forms of movement in one or more planes or directions, two or more planes or directions, three or more planes or directions or multiple planes or directions. Exemplary forms of movement include oscillating, rotating, swinging, twirling, twisting, bobbing, tapping or combinations thereof. Body 20 can be spring-like, flexible, semi-flexible or rigid and can have any length, width, thickness, weight or other characteristic suitable for inducing movement having a resonance frequency that corresponds to the resonance frequency of a surrounding environment. In one embodiment, the movement of arm 3 has substantially the same periodicity as the motion or force of a surrounding environment.

One or more masses 17 are integrally or removably attached to a surface of arm 3. Alternatively mass 17 may be formed within arm 3, creating a higher density arm region than that of adjacent arm regions. Mass 17 may be positioned anywhere along the length of arm 3, including a proximal end 18, distal end 16, middle region 14 or adjacent regions thereof. Additionally, mass 17 can have any weight, dimension, configuration or other characteristic suitable for inducing movement of arm 3 in response to a motion or force of a surrounding environment. Capable of moving in one or more, two or more or multiple planes, mass 17 can undergo various forms of motions, such as oscillating, twirling, twisting, bobbing, swinging, rotating, tapping motion or combinations thereof. In one embodiment, mass 17 is rigidly attached to and moves in unison with arm 3. Alternatively, mass 17 may be attached by a fastener, such as a hook, latch, clip or cord, and can move independently of arm 3 while still kinematically constrained to arm 3.

Arm 3 and mass 17 can be arranged in any zero load orientation at rest, irrespective of the force of gravity. In the embodiment of FIGS. 1(a)-1(b), the length of body 20 can be substantially parallel and horizontal to the ground, substantially perpendicular to the direction of gravity in an initial rest position. In one embodiment, arm 3 is oriented about 45° to about 135°, preferably, about 75° to about 105°, more preferably, about 80° to about 100° with respect to the ground. At rest, arm 3 can also be oriented anywhere within graphical quadrants I or II of FIG. 2. For example, arm 3 can be oriented with respect to the ground, represented by the lower portion of the y axis, at about 90° to about 270°, preferably, about 90° to about 180°, more preferably, about 135° to about 225°. Arm 3 can be positioned in the aforementioned unique rest positions by virtue of suspension system 5, as shown in FIG. 1(a).

Suspension system 5 includes one or more load bearing springs 21 for suspending arm 3 with respect to housing 15, allowing arm 3 to be oriented in any initial rest position. Springs 21 provide and/or magnify the inertial forces that induces arm 3 to rebound and return to its initial position of rest upon displacement therefrom. In operation, springs 21 initially stores potential energy as arm 3 is displaced from equilibrium and induced by inertial forces to move. When arm 3 has reached a maximum displacement in a direction of travel, the potential energy stored within spring 21 is subsequently released and transferred to arm 3, forcing it to move in the opposite direction of travel. Therefore, springs 21 facilitate the continued movement of mass 17 and/or arm 3 along a resonance path. By selecting the appropriate springs 21, suspension system 5 can tune the motion of arm 3 so that its resonance frequency corresponds to the resonance frequency of a surrounding environment, enabling optimal capture of the kinetic energy of a surrounding environment.

Figure 2:
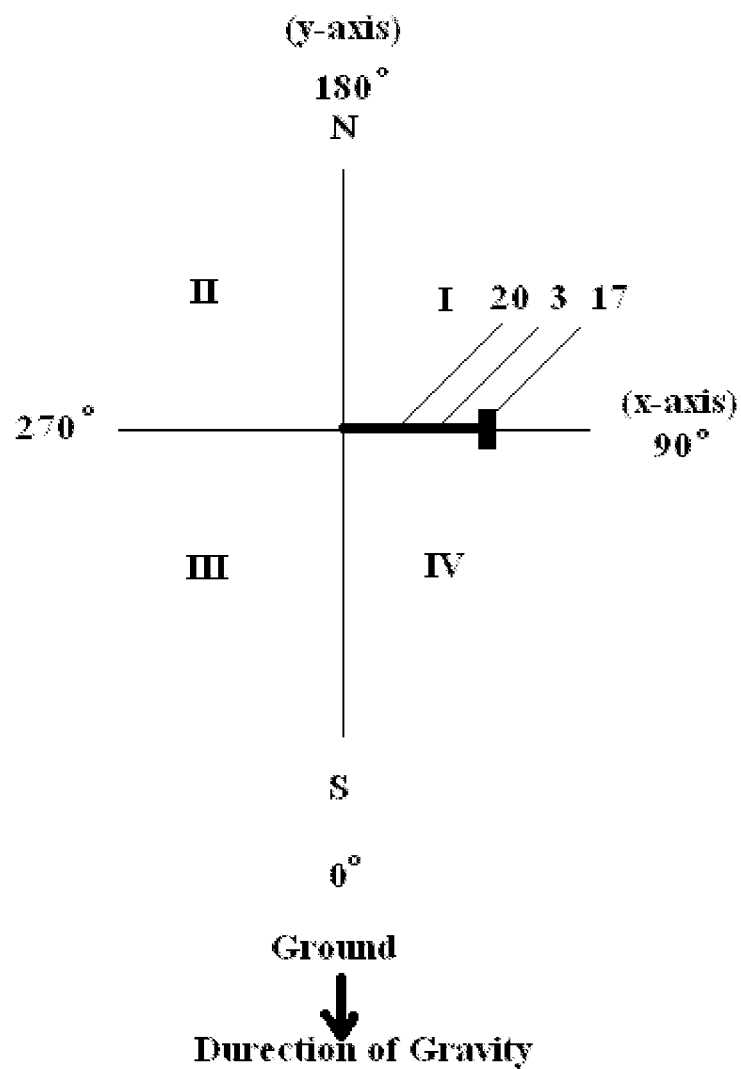
FIG. 2 is a schematic diagram showing the potential orientation of the armature in an initial rest position relative to the ground.

A first end 22 of spring 21 can be removably or permanently coupled to any surface of arm 3 and/or mass 17, including an upper, lower or side surface thereof. A second end 24 of spring 21, spaced apart from and opposite to first end 22, can be removably or permanently coupled to a surface of housing 15, including an upper surface 52, lower surface 54 or side surface 56 thereof. In one embodiment, spring 21 can be removably attached to various points along the length of arm 3, mass 17 and/or housing 15 allowing it to be adjustably positioned. In this embodiment, two or more fasteners, preferably a plurality of fasteners, such as loops, hooks, latches, clips and snaps, can be positioned along arm 3, mass 17 and housing 15, and corresponding fasteners, such as loops, hooks, latches, clips and snaps, can be positioned on first and second ends 22, 24 of spring 21. Optionally, a lever can be attached to spring 21, passing through a slot on housing 15, allowing a user to manually adjust the position of spring 21 relative to a surface of housing 15. A locking mechanism can also be optionally attached to the lever and/or housing 15 to secure spring 21 in a desired position once it has been moveably adjusted. In another embodiment, a trough or guide rail 30 is mounted to and spans a substantial length of arm 3. First spring end 22 can be attached to a slidable member 32 that is coupled to and slides along guide rail 30 while second spring end 24 is attached to a surface of housing 5 by the fasteners. Alternatively, as shown in FIG. 1(c), guide rail 30 is mounted to housing 15 and second spring end 24, attached to slidable member 32, is capable of sliding along housing 15 while first spring end 24 is attached to a surface of arm 3 or mass 17 by the fasteners. Guide rails could also be mounted to both arm 3 and housing 15 allowing spring 21 to slide along both surfaces. To facilitate adjustment, optionally, a lever connected to slidable member 32 and/or a spring end 22, 24 at one end extends through a slot on housing 15. A user may then adjust the position of spring 21 by moving the end of the lever extending through housing 15. A locking mechanism attached to the lever and/or housing 15 can be provided to secure spring 21 in a specified position once it has been moveably adjusted. Therefore it may be possible to manually tune suspension system 5 of energy harvester 1 to accommodate and optimize energy capture in changing or different environmental states.

Figure 3:
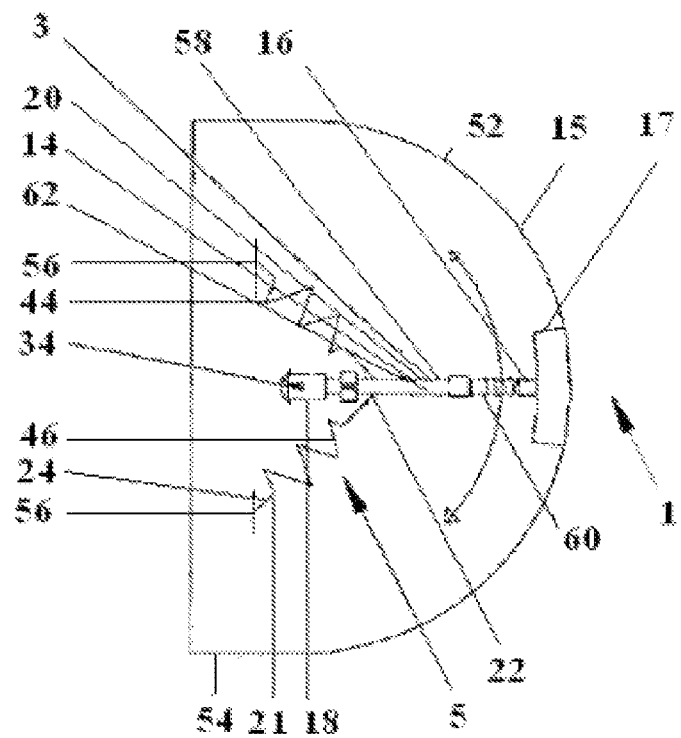
FIG. 3 is a schematic diagram of a suspension system including a pair of linear springs.

One or more springs 21 may be arranged in various different configurations with respect to arm 3, mass 17 and housing 15. As shown in FIGS. 1(a) and 1(c), a first spring 44 is connected to an upper surface 58 of arm 3 at a proximal end 18 thereof, suspending arm 3 from a side surface 56 of housing 15, facilitating an upward rotation of arm 3. Suspension system 5 can further include a second spring 46 connecting a lower surface 60 of arm 3 at a proximal end 18 thereof to a lower housing side surface 56, facilitating a downward rotation of arm 3. Although suspension system 5 is shown as a two spring system in FIG. 1(a), energy harvester 1 can be effectively operated with only one spring 21. As shown in FIG. 1(a), spring 21 is a torsion spring, having a spring rate of about 0.025 Nm/degree to about 0.4 Nm/degree, that is wrapped around a cylindrical guide 38, forming an L shaped configuration. First and second springs 44, 46 are capable of sliding along a length of arm 3 and are flexible in the radial direction. As shown in FIG. 1(c), two troughs or guide rails 30 are fixedly attached along a length of arm 3 on an upper and lower surface 58, 60 thereof. A slidable member 32 and first springs 44 attached thereto, are received within a channel of guide rail 30, allowing first spring 44 to be slid along a length of arm 3. Second spring 46, operatively connected to guide rail 30, in the same manner is similarly adjustably positioned. A similar suspension system is shown in FIG. 3. In this embodiment, first and second springs 44, 46 are configured as linear springs. First ends 22 of these linear springs can be similarly attached to a sliding member and received within a channel of guide rail 30 to enable slidable adjustment during operation.

Figure 4:
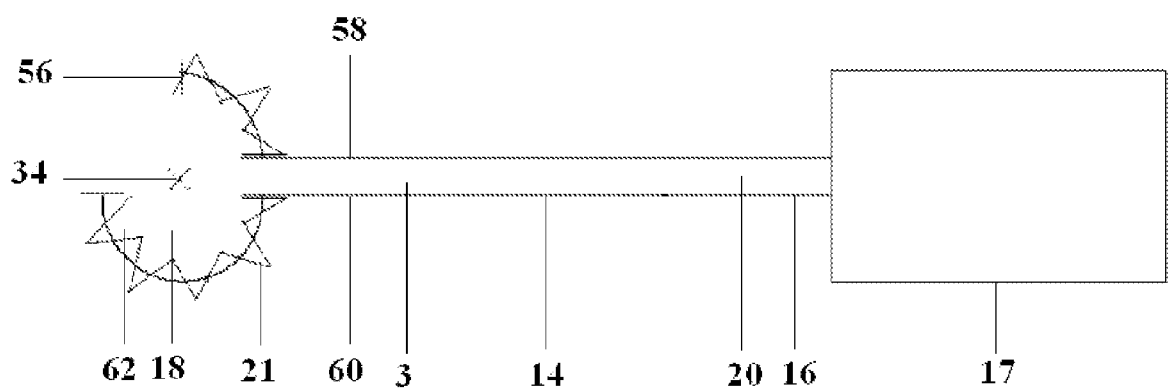
FIG. 4 is a schematic diagram a suspension system including a torsional spring attached at a proximal arm end.

Alternatively, as shown in FIG. 4, spring 21 connects a proximal arm end 18 along a side surface 62 thereof to a housing side surface 56, curving around hinge point 34 to facilitate upward rotation of arm 3. A second spring 21 can be similarly attached to the opposite side of proximal arm end 18 and housing side surface 56. A substantially circular or C shaped track adapted to receive spring 21 can be attached to the two opposite side surface of arm 3, curving about hinge point 34. The spring rate of spring 21 can be about 0.025 to about 0.4 Nm/degree.

Figure 5:
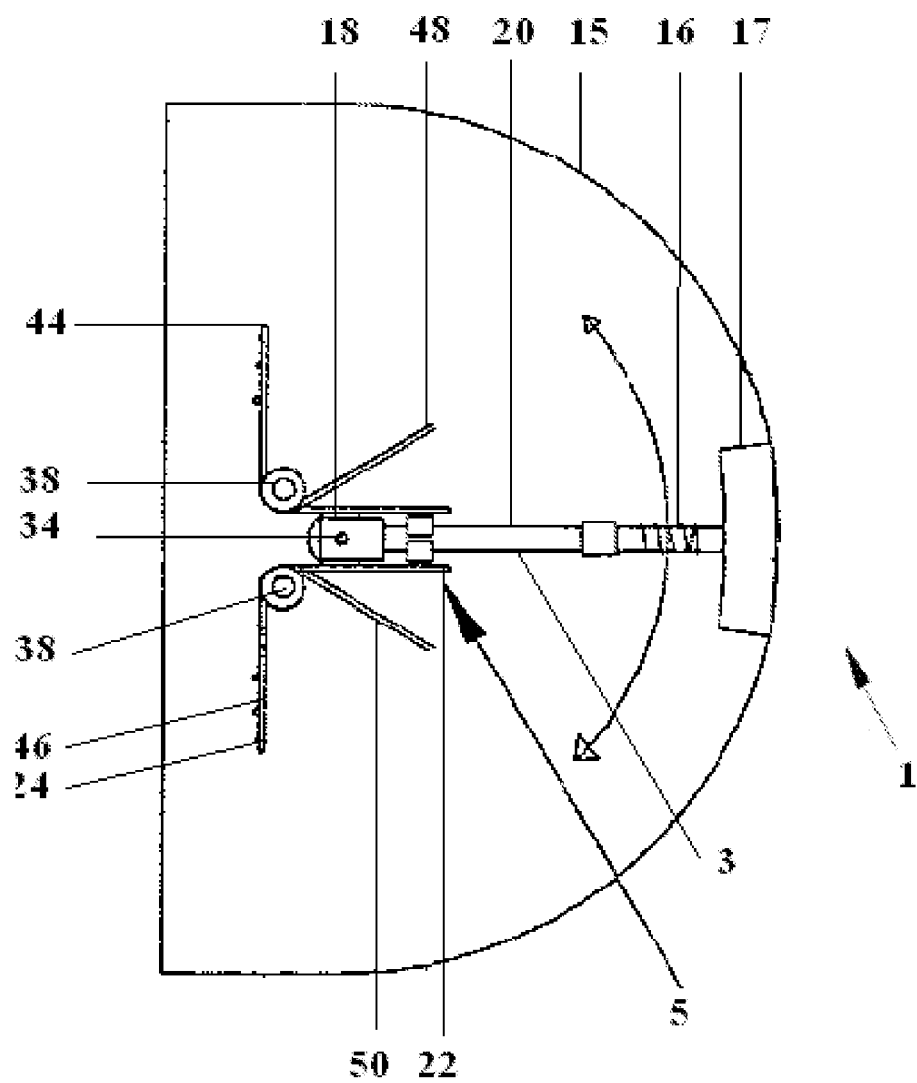
FIG. 5 is a schematic diagram a suspension system including two pairs of springs to design to facilitate the start-up of the energy harvester.

Another embodiment of suspension system 5 is shown in FIG. 5, including the same first spring 44 and second spring 46 as previously shown and described in FIG. 1(a). As arm 3 and mass 17 are displaced from equilibrium, initially first and second springs 44, 46 will provide inertial forces that resist displacement. The spring rate of first and second springs 44, 46 are low, facilitating the energy harvester 1 to overcome an initial start-up friction that resists the initial movement of arm 3 and mass 17 from rest. An exemplary spring rate is about 0.005 Nm/Deg to about 0.05 Nm/Deg. Preferably configured as torsion springs, a third spring 48 and fourth spring 50 are attached to a side surface of housing 15 and wrapped around a cylindrical guide 38 overlapping with the position of first and second springs 44, 46. The opposite ends of third and fourth springs 48, 50, however, are outwardly splayed and angularly spaced apart from the equilibrium position of arm 3, forming a V shaped configuration. Arm 3 travels between and the two splayed ends of third and fourth springs 48, 50. In an exemplary embodiment, the angle formed between an equilibrium position of arm 3 and the splayed end of springs 48, 50 is about 5° to about 25°. The spring rate of third and fourth springs 48, 50, the resonance frequency and arm 3 and mass 17 is substantially increased, facilitating the continued movement of arm 3 and mass 17 as well as responsiveness of arm 3 and mass 17 with respect to surrounding environmental motions and forces.

Exemplary springs 21 that can be used in suspension system 5 include tension compression springs, tension springs, memory metal or alloy springs, coiled springs, torsion springs, linear springs, retractable elastic spring cords, and springs with constant or variable spring rates. To capture the kinetic energy generated by the low resonance frequency motion of a surrounding environment, the spring rate of spring 21 can be about 0.01 Nm/Deg to about 5.0 Nm/Deg, preferably, about 0.05 to about 0.2 Nm/Deg. In one embodiment, spring 21 can have a variable spring rate that can vary by the magnitude of the force acting on arm 3. For example, when using a spring with a variable spring rate, the spring force can increase in spring-rate once an optimal motion, such as an optimal oscillation or swing motion, of arm 3 is achieved.

Figure 6:
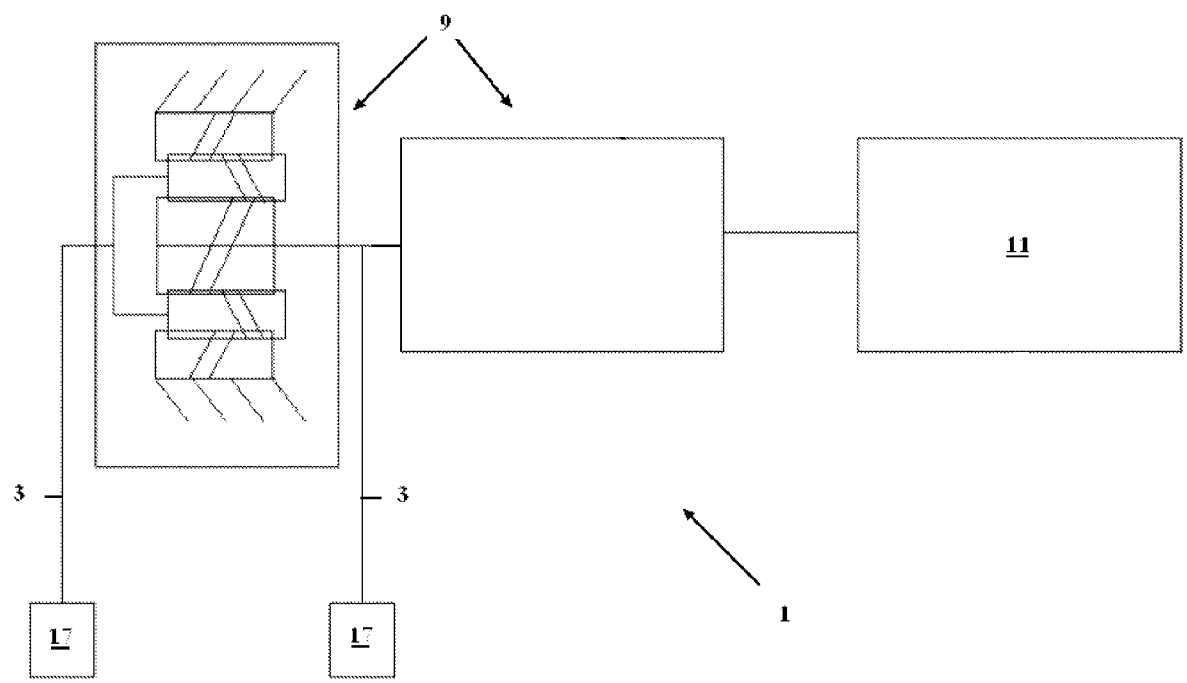
FIG. 6A is a schematic diagram of an energy harvester including two pivoting arms of various length.
Figure 6A:
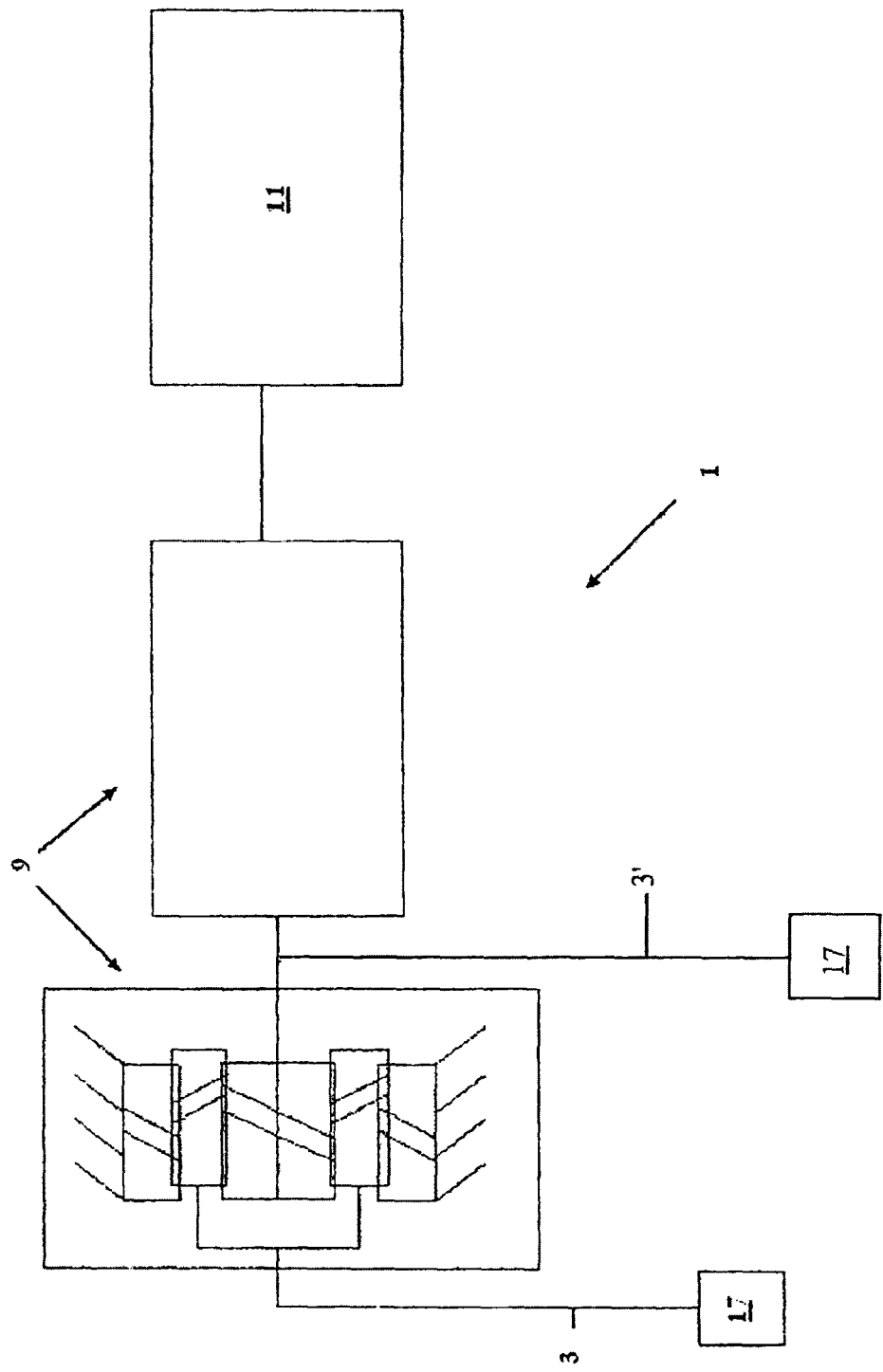

As shown in the exemplary embodiment of FIGS. 1(a) and 1(b), a rectangular mass 17 is rigidly attached to a distal end of an elongated rigid arm 3. Mass 17 and arm 3 form an integral cantilever structure pivoting about a hinge point 34, where proximal arm end 18 is attached to a shaft 36 of gearing system 9. Mass 17 can be about 10 to about 70 grams, preferably, about 15 grams to about 25 grams, and the length of arm 3 can be about 5 cm to about 15 cm, preferably, about 5 cm to about 10 cm. Arm 3 and mass 17 move in unison, swinging in an arcuate motion over a range of about 0° to about 180°, about −90° to about +90° relative to an initial rest position that is substantially horizontal and parallel to the ground. Two springs 21, connecting arm 3 to housing 15, facilitates the continued movement and tunes the resonance frequency of arm 3 relative to the motion and forces of a surrounding environment. A first spring 44 is attached to an upper surface 58 of proximal arm end 18 at first spring end 22 and attached to a side surface 56 of housing 15 at a second spring end 24, vertically suspending arm 3. A second spring 46 is similarly attached between a lower surface 60 of proximal arm end 18 and a lower housing side surface 56. The kinetic energy from the rotation of mass 17 and arm 3 is derived from the motion and forces of the surrounding environment acting on arm 3 and the inertia force generated by suspension system 5 in response thereto. In the embodiment of FIG. 6, energy harvester 1 has two or more arms 3 and masses 17. Two or more sets of arms 3 and masses 17 having the same size, dimension and configuration may be provided to increase the amount of kinetic energy captured by energy harvester 1. Alternatively, two or more arms 3 can have different lengths and two or more masses 17 can have different weights in order to efficiently capture the kinetic energy produced from environmental motions and forces having different frequencies. Additionally, masses 17 can be integrally or removably positioned at different locations on two or more arms 3 to further optimize and capture the kinetic energy. For example, if an environment exhibits two environmental states, such as high and low frequency motions or forces, a first mass 17 and arm 3 can be sized, positioned and arranged to capture the kinetic energy produced by one environmental state while another arm 3 and mass 17 can be appropriately sized, positioned and arranged to efficiently respond to and capture of the kinetic energy produced by the another environmental state. Springs 21 may be attached to arm 3, mass 17, housing 15 or combinations thereof in the same manner as previously discussed. The two arms 3 or a plurality of arms 3 can be electrically connected and arranged in parallel or series. Each arm can be connected to a separate or common gearing system 9 that translates the kinetic energy to the generator 11, wherein gearing system 9 can be any simple gearing mechanism or a plenary gearing system. A clutch can be connected to gearing system 9 to harmonize the motion of the two or more arms 3 and masses 17 when arms 3 are designed to capture a single environmental state. Alternatively, the system can be designed without a clutch in order to capture kinetic energy of different environmental states.

Optionally, as shown in FIGS. 7(a-d), one or more bumper members 7, preferably one or more pair of bumper members 7, can be used to restrain the movement of the arm 3 and mass 17 to a desired path relative to housing 15. Bumper members 7 also provide a surface from which arm 3 and/or mass 17 can rebound and may also function to tune the resonance frequency of arm 3 and mass 17. Bumper members 7 can have any shape, size or configuration suitable for controlling the motion of arm 3 and mass 17 in one or more directions. In an exemplary embodiment, bumper members 7 can have a variable resistive strength, can be movably positioned and/or has a resistive strength that can be adjusted to optimize capture of the kinetic energy of the system.

Figure 7A:
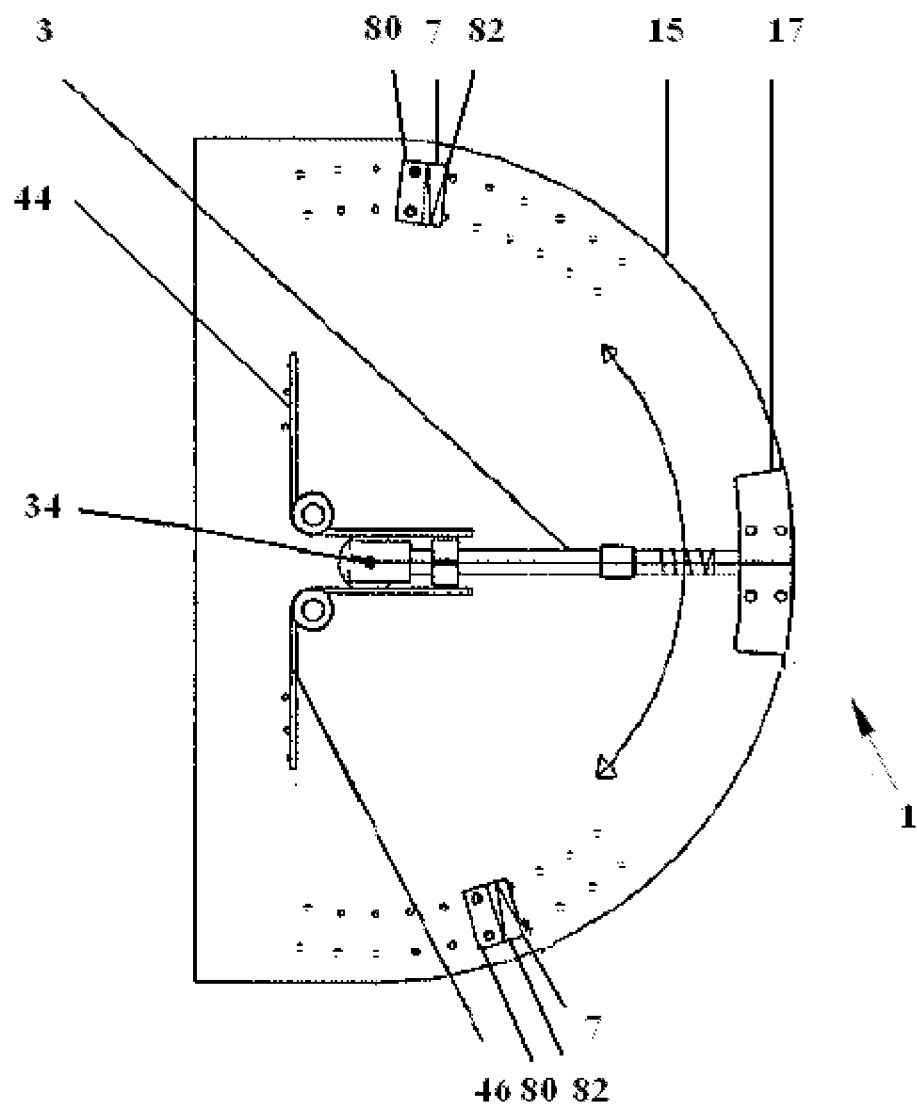
FIG. 7(a) is a schematic diagram of an energy harvester including two spring bumper members.

In the embodiment of FIG. 7(a), bumper member 7 can include a spring element 82, having a constant or variable spring rate, or a spring like material that enables arm 3 and/or mass 17 to rebound when it impacts bumper member 7. As shown in FIG. 7(a), bumper member 7 is a two component system including a rigid and force absorbing stop member 80 that is attached to a spring element 82. Alternatively, bumper member 7 can be configured as a stand alone spring element attached to housing 15.

In the embodiments shown in FIGS. 7(b)-7(d), bumper member 7 can have a polarized magnetic element 84, and mass 17 can include one or more magnetic elements 86. Bumper member 7 can be configured as a two component system including a rigid and force absorbing stop member 80 attached to a magnetic element 84. Alternatively, bumper member 7 can be a stand alone magnetic element 84 attached to housing 15. As shown in FIG. 7(b), mass 17 has two oppositely polarized magnetic elements 86, located within opposite ends of mass 17 and facing in opposite directions. In FIG. 7(c), mass 17 includes a magnet 86 with having oppositely polarized surfaces located within opposite ends of mass 17. The surface polarity of each end of mass 17 is identical to the polarity of a facing corresponding bumper member 7. When bumper member 7 is fabricated from a magnet 84 having an identical polarity to mass 17, mass 17 can be repelled upon reaching a predetermined proximity to bumper member 7. Mass 17 can be repelled from, without physically impacting, bumper member 7.

In another embodiment, bumper members 7 can be fabricated from a material that absorbs the impact force and slows the motion of mass 17. Additionally, bumper members 7 and/or mass 17 can be fabricated from a piezoelectric material that generates energy each time mass 17 impacts bumper member 7. These piezoelectric elements can be connected to energy storage facility 76 in FIG. 8 through a power transformer and can provide a secondary source of energy generation.

In another embodiment, the applied force or position of one or more bumper member 7 can be adjusted during the operation of inertial energy harvester 1 to match the changing resonance frequency of arm 3 and mass 17 to the motion and force of a surrounding environment. For example, bumper member 7 can be an electromagnetic element, the magnetic force for which can be adjusted during operation to shorten or lengthen the path of motion of arm 3 and mass 17. The electromagnetic element can be attached to or otherwise operatively associated with a control mechanism, preferably a remotely located control mechanism, for adjusting the resistive force. Alternatively, a lever attached to bumper member 7 that extends through housing 15 may enable a user to movably position bumper member 7 along two or more or a plurality of locations along a track that bumper member 7 may be slidably positioned thereon. A locking mechanism attached to the lever and/or housing 15 can be provided to secure bumper member 7 once the position has been adjusted as desired. Adjustment may also be accomplished when bumper member 7 is configured as a spring having a variable spring rate that affects the force applied to mass 17. Bumper member 7 can also be repositioned or entirely removed from energy harvester 1 during operation to adjust the path of motion of mass 17 or removed from the energy harvester.

A proximal end of arm 3 can be directly or indirectly connected to one or more gearing systems 9 at hinge point 34 to efficiently translate the kinetic energy derived from the movement of arm 3 to generator 11. Each gearing system 9 can include one or more gearing mechanism having any shape, size or configuration suitable for transferring kinetic energy from arm 3 to generator 11. In one exemplary embodiment, gearing system 9 can include one or more rotational gears, sprockets, and/or chains. An exemplary gearing system 9 can be a simple structure including one or more operatively connected gears, such as in a planetary gearing system. Alternatively, gearing system 9 can include a continuously variable transmission ("CVT") having an optimized gear ratio configuration configured to complement the motion or forces of an environment. The CVT system can be capable of sensing changes in an environmental state and automatically changing the ratio of the arm speed relative to the generator speed ("gear ratio") in response thereto. The gear ratio of the CVT can be controlled either by electrical actuation based on feed back from the environment using an appropriate automated transfer mechanism or by inertial actuation based on input speeds. In another embodiment, gearing system 3 can include one or more pulley and levers.

Energy harvester 1 can further include one or more generators 11, including any device capable of converting kinetic energy transferred from arm 3 to electrical energy. In one embodiment, generator 11 can include a rotor, motor and/or electromechanical transducer.

Figure 8:
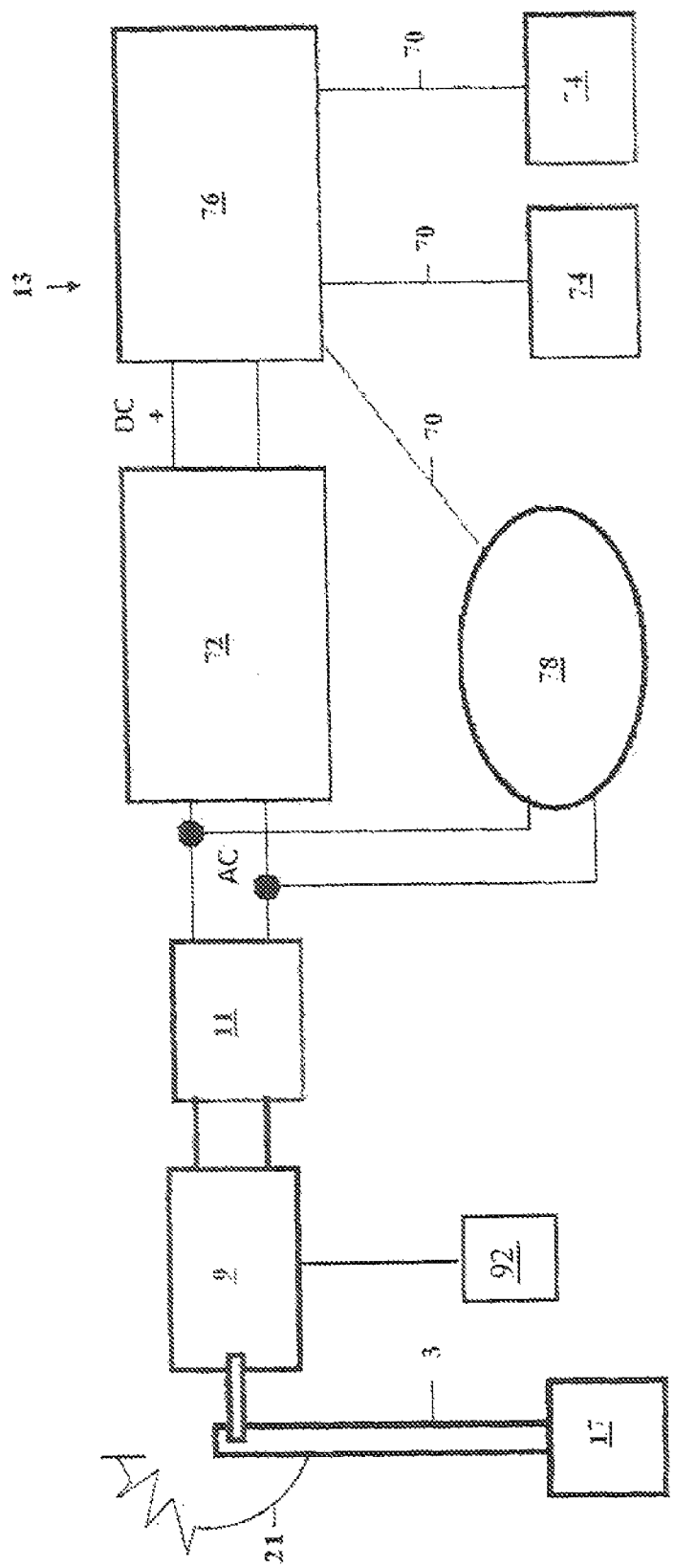
FIG. 8 is a schematic diagram of energy harvester showing arm 3, gearing system 9, generator 11 and energy distribution system 13.

As shown in the alternative embodiment of FIG. 8, generator 11 can be positioned on, attached to or integrally formed with mass 17. A gearing system 9 is located along the length of arm 3, wherein a first sprocket 51 of the gearing system is affixed to housing 15 and a second sprocket is affixed to the input shaft of gearing system 9. A drive belt is connects first and second sprockets 51, driving gearing system 9. Gearing system 9 can be used to transmit information about the position and/or speed of arm 3 to generator 11.

Figure 9:
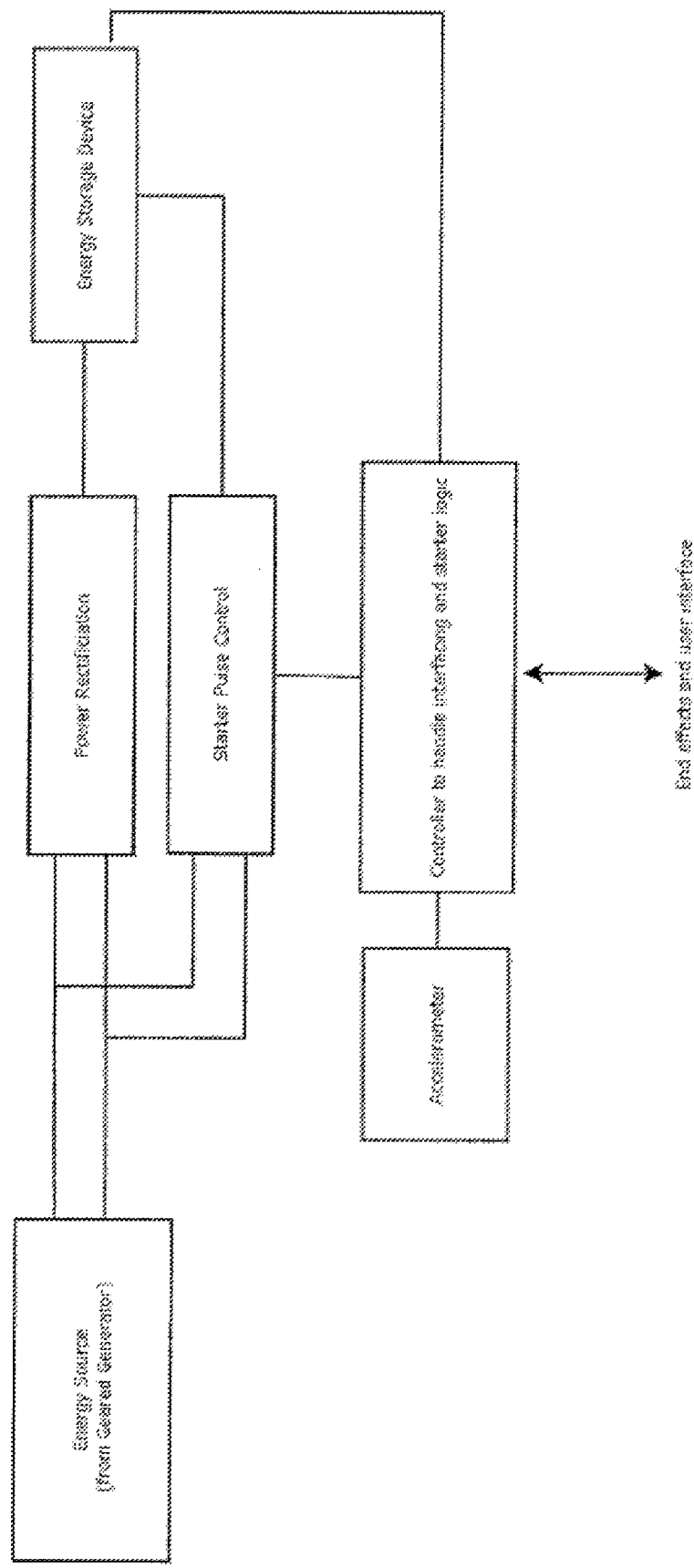
FIG. 9 is a circuit diagram showing generator 1 operating as a starter system.

As shown in the system diagram of FIG. 8, in addition to functioning as an electromechanical transducer, generator 11 can in some situations further function as a starter system that initiates the inertial forces and movement of arm 3. A circuit diagram of the starter system is illustrated in FIG. 9. The starter system can include circuitry and sensors 78 that detect the acceleration, velocity and/or position of arm 3, such as an accelerometer. The input from the accelerometer and power rectifier determine when to provide power, the amount of power to be supplied and the direction that rotation is to be induced. If the arm speed is lower than a programmed acceleration threshold, a microcontroller 92 is programmed to direct generator 11 to provide a burst of power to gearing system 9, such as a CVT transmission, to initiate movement of arm 3 and overcome the initial start-up friction inhibiting movement of arm 3. In this embodiment, generator 11 temporarily acts as a motor for driving arm 3 and mass 17 of arm 3 to move arm 3 and overcome its initial state of rest. The power supplied by generator 11 can be provided from energy storage facility 76.

As shown in FIG. 8, energy produced by the generator 11 can be subsequently transferred to an energy distribution system 13 that can include a one or more conductive wires 70 connected to a voltage meter or power rectifying circuitry 72, electrical device 74 and/or an energy storage facility 76, such as a capacitor or battery. Electricity produced by generator 11 is stored within energy storage facility 76 and subsequently used to power an electrical device 74. In another embodiment, the generated electricity is fed directly to an electrical device 74, such as LED lights, beacons, tracking systems, global positioning systems, alarms, alerting devices, data logging systems, medical devices, battery chargers, cell phones, portable music players, health monitors, radio trackers or other consumer electronic devices. Energy harvester 1 can be used to power multiple electrical devices, each with its own on/off switch to control the distribution of the generated electricity. A microcontroller 92 can be attached to generator 11 such that power to an appliance can be cut off when there is no ambient mechanical system movement. Supplemental energy can be stored in an energy storage facility 76. In one embodiment, energy harvester 1 can produce about 0.5 mW to about 500 mW of power, preferably about 1 mW to about 500 mW of power, more preferably, about 10 mW to about 500 mW of power. Alternatively, energy harvester 1 can produce about 10 mW or more of power, preferably, about 25 mW or more of power. This energy output level can be derived solely from low frequency environmental motions or forces, such as ambient or environmental oscillations within the range of about 0.25 Hz to about 10 Hz. Greater energy output may be achieved depending upon the available motion and forces of an environment.

The gearing system 9, generator 11, an energy distribution system 13 can be enclosed within housing 15. In an exemplary embodiment, arm 3, a suspension system 5 and/or bumper member 7 can be either located within housing 15 or can be external to housing 15. In an exemplary embodiment, housing 15 can be a small, compact and portable and light weight structure of about 5 cm×10 cm in width to about 12 cm×24 cm in length, weighing about 1.5 oz or less. As an added protective means, housing 15 can be hermetically sealed.

The present invention further includes alternative energy harvester designs 201, 301, as shown in FIGS. 10(a)-11(b), that are also driven by inertial forces. The energy harvesters of these embodiments can include one or more of the same or similar components of and can have the same or similar mechanical, material and electrical properties as that of the aforementioned embodiments of energy harvester 1. Additionally, energy harvesters 201, 301 are capable of efficiently capturing the kinetic energy of a surrounding environment and transforming it to electricity in a similar manner as that of energy harvester 1. Similarly, they are driven by inertial forces and are not dependent upon gravitational force to generate energy. Furthermore, energy harvesters 201, 301 can capture energy from a wide variety of environments and can be used in the same manner as that of energy harvester 1.

Figure 10A:
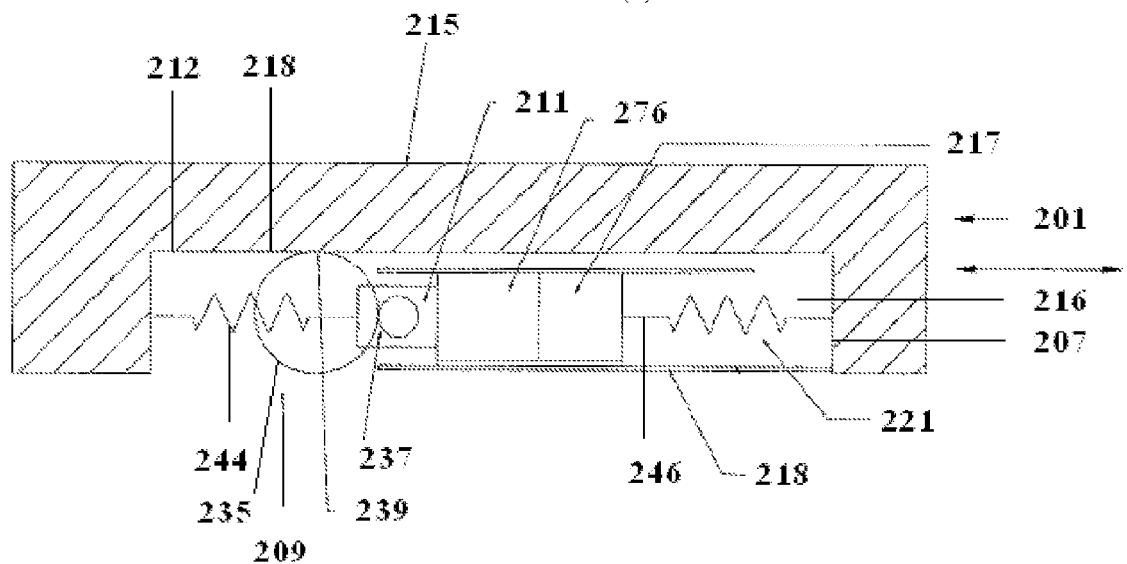
FIG. 10(a) is a schematic diagram showing another inertia driven linear energy harvester.
Figure 10B:
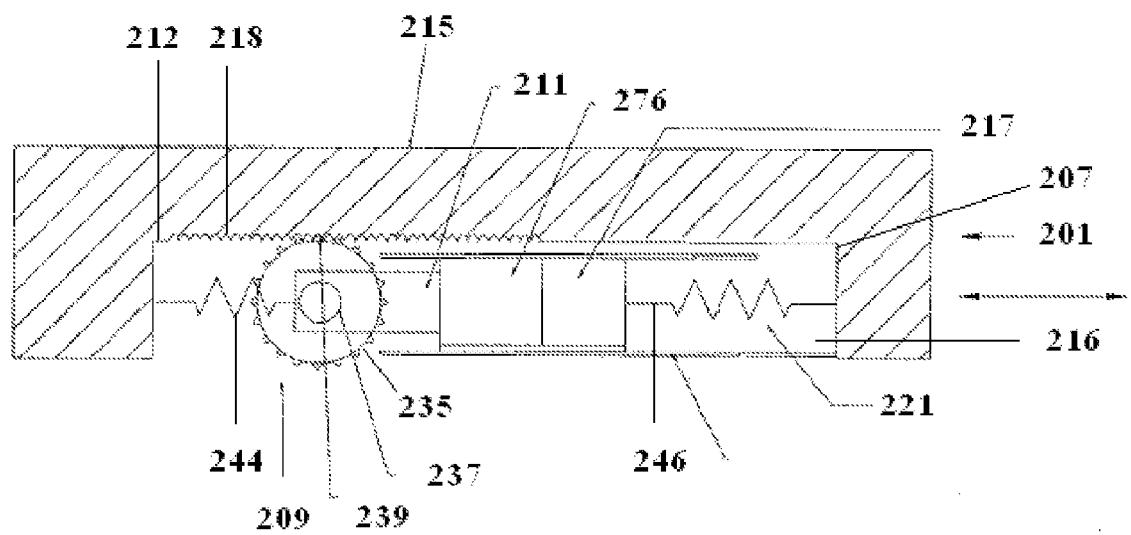
FIG. 10(b) is a schematic diagram showing an alternative embodiment of inertia driven linear energy harvester.
Figure 10C:
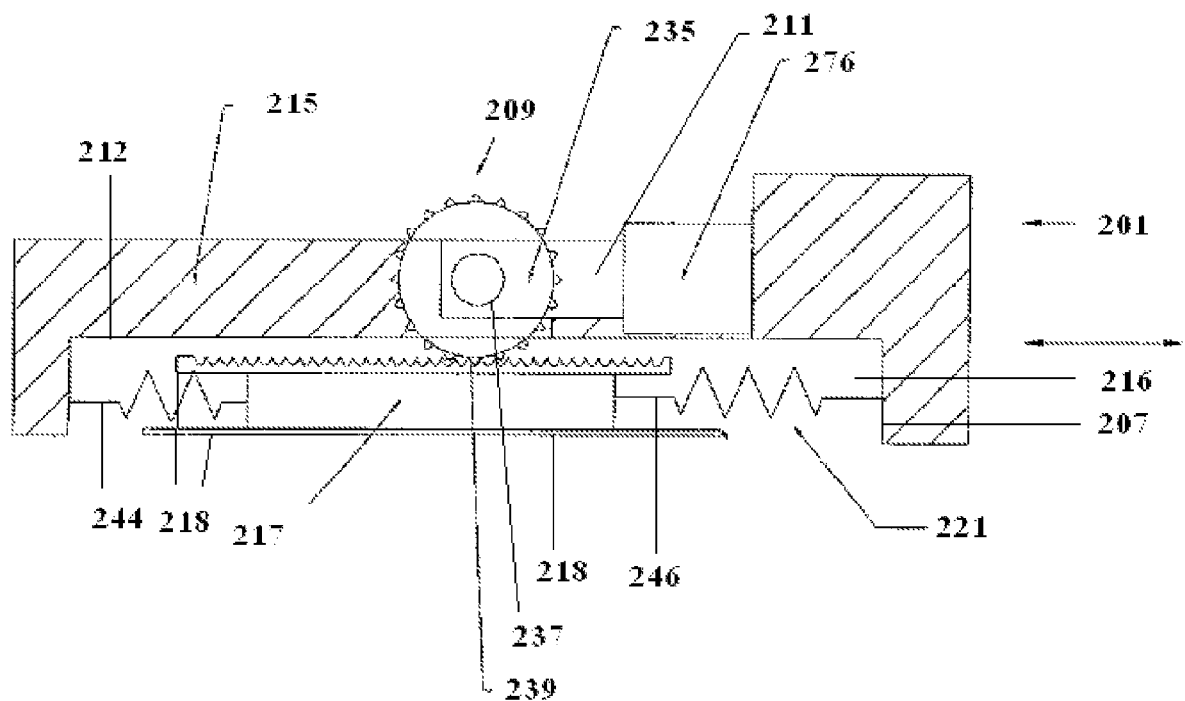
FIG. 10(c) is a schematic diagram showing another inertia driven linear energy harvester.

FIGS. 10(a)-10(c) show embodiments of inertia driven linear energy harvesters 201, including a mass 217 movably positioned within a housing 215 that generates kinetic energy. One or more springs 221 are provided Energy harvester 201 further includes a gearing system 209 and generator 211 for conveying and transforming the kinetic energy of mass 217 to electricity.

Housing 215 can be configured as any suitable structure including an interior cavity 216 for receiving mass 217. In one embodiment, housing 215 is configured as a tubular or rectangular casing with an elongated interior cavity 216 along which mass 217 slides. The length of cavity 216 can be configured to having a curved, arcuate or substantially circular geometry along which mass 217 travels. Alternatively, housing 215 can be configured as a linear tube. Optionally, a track 218 may be attached to or integrally formed within housing cavity 216 along the length of one or more or two or more walls 212 that define cavity 216 to facilitate the slidable movement of mass 217. As shown in FIG. 10(a), housing cavity 216 can have a smooth track 218 configuration that engages a wheel or gear 235 of gearing system 209. Alternatively, as shown in FIG. 10(b), track 218 can have a plurality of teeth like structures that engage and secure wheel or gear 235 in a rack and pinion configuration. Energy generator 201 can further include ball bearings and/or brushings attached to the interior housing wall 212 or attached to mass 217 to facilitate movement of mass 217.

Springs 221 tune the resonance frequency of mass 217 to the resonance frequency of a motion or force of a surrounding environment and assists mass 217 in generation of kinetic energy. As shown in FIGS. 10(*a*)-(*b*), one or more springs 221 can be directly or indirectly attached to mass 217. As shown in FIG. 10(*a*), a first spring 244 is attached to a first end of mass 217 and a second spring 246 is indirectly attached to a second end of the mass 217 via a wheel or gear 235 that facilitates movement of mass 217 within housing cavity 216. A two spring system is depicted in FIGS. 10(*a*)-10(*b*), however, energy harvester 201 can be constructed with only one spring 221, with two or more springs 221 or with a plurality of springs. In one embodiment, springs 221 can have the same properties and configurations as that described in energy harvester 1.

In an exemplary embodiment, one or more bumper members 207 can be positioned within of housing cavity 216 to encourage the mass to rebound in an opposite direction. In one embodiment, a pair of bumper members 207 can be positioned at opposite ends of housing cavity 216. In another embodiment, bumper member 207 can be a spring or spring like material that enables mass 217 to rebound upon direct or indirect impact of bumper member 207. In another exemplary embodiment, mass 217 and bumper member 207 can be fabricated as magnets having the same polarity such that mass 217 can be repelled upon reaching a preset proximity to bumper member 207. Either one or more portions, surfaces or the entirety of mass 217 can be magnetized such that mass 217 can be repelled without impacting bumper member 207. In another embodiment, bumper members 207 can be a surface of wall 212 forming interior housing cavity 216. Bumper member 207 can also be constructed from a piezoelectric material that generates energy each time mass 17 impacts bumper member 7. These piezoelectric bumper members can be connected to energy storage facility 276 through a power transformer and can provide a secondary source of energy generation.

A gearing system 209 efficiently translates the kinetic energy derived from the movement of mass 217 to generator 211. Gearing system 209 includes a wheel or gear 235 positioned within housing cavity 216 that is operatively associated with mass 217. Wheel or gear 235 is induced to rotate as mass 217 travels along the length of housing cavity 216. Gearing system 209 may further include one or more gearing mechanisms, such as gears, sprockets, and/or chains, that assist in transferring kinetic energy from mass 217 to generator 211. For example, an interfacing gear component 237 engaging wheel or gear 235 is connected to and turns a rotor of generator 211. Generator 211, which may include a rotor, motor and/or electromechanical transducer, subsequently produces electricity from the transferred kinetic energy of mass 217. Generator 211 is further connected to an energy distribution system that is the same as or similar to that of FIG. 8, including an electronic device and/or an energy storage facility 276, using wires or via a track and rail system of housing 215.

With respect to FIGS. 10(*a*)-10(*b*), because wheel of gear 235, gearing system 209 and generator 211 can be directly or indirectly attached to and move with mass 217, inertial forces and power generation capacity is enhanced. Alternatively, as shown in FIG. 10(*c*), gearing system 209 and generator 211 are fixed to housing 215. An upper surface of mass 217 is fixedly attached to a track 218 that can be configured to have a plurality of teeth like structures. The kinetic energy of mass 217 is imparted to gearing system 209 as track 218 moves with mass 217 and engages as well as induces wheel or gear 235 to rotate.

In one embodiment, energy harvester 201 may also be able to generate energy from magnetic induction. In this embodiment, mass 217, having one or more magnetic elements, is movably positioned within housing 215, around which is wrapped around one or more magnetic coils, so as to generate electricity by virtue of magnetic induction.

FIG. 11(*a*)-11(*b*) show an alternative multi-axis energy harvester 301 that is also driven by inertial forces. Energy harvester 301 includes an arm 303, gearing system 309, generator 311, energy distribution system (not pictured) and housing 315. One or more of the components of inertial energy harvester 301, such as arm 303, mass 317, gearing system 309, generator 311 and energy distribution system (not pictured), can have the same as or have similar mechanical, material and electrical properties, components and operational functions as the corresponding components of energy harvesters 1, 201. Energy harvester 301 is capable of inducing arm 303 to rotate about one or more, two or more or three axes to enhance energy capture.

As shown in FIG. 11(*a*), mass 317 is attached to a distal end of an arm 303. Arm 303 and mass 317 can have the same configuration, dimension and properties as the corresponding components described in energy harvester 1. A proximal end of arm 303 is pivotally connected to a gearing system 309 about hinge point 334. In one embodiment, arm 303 is flexible, enabling mass 317 to freely move in an unconstrained manner in three dimensions about an x, y and z axis. Alternatively, arm 303 can be rigid or semi-rigid, enabling rotation about axis A1 of hinge point 334.

Gearing system 309 and generator 311 can be directly or indirectly attached to a planar base member 335. Gearing system 309 and generator 311 can also be integrally formed with or removably positioned on base member 335. As shown in FIG. 11(*a*), gearing system 309, generator 311 and arm 303 can be supported by a base member 335 that is permanently or removably coupled to a curved or circular track 337 via one or more, preferably a pair of fasteners 339. As shown in FIG. 11(*a*), base member 335 is free to rotate up to 360° along circular track 337 about an axis A3. Any system imbalance will create torque, inducing rotation of base member 335.

This system, including base member 335, arm 303, gearing system 309, generator 311 and an energy distribution system (not pictured) can be encased within a first housing 315, wherein track 337 is formed on or embedded within an interior surface of housing 315. First housing 315 can has a annular shape, as shown in FIG. 11(*a*) or spherical shape.

Figure 11A:
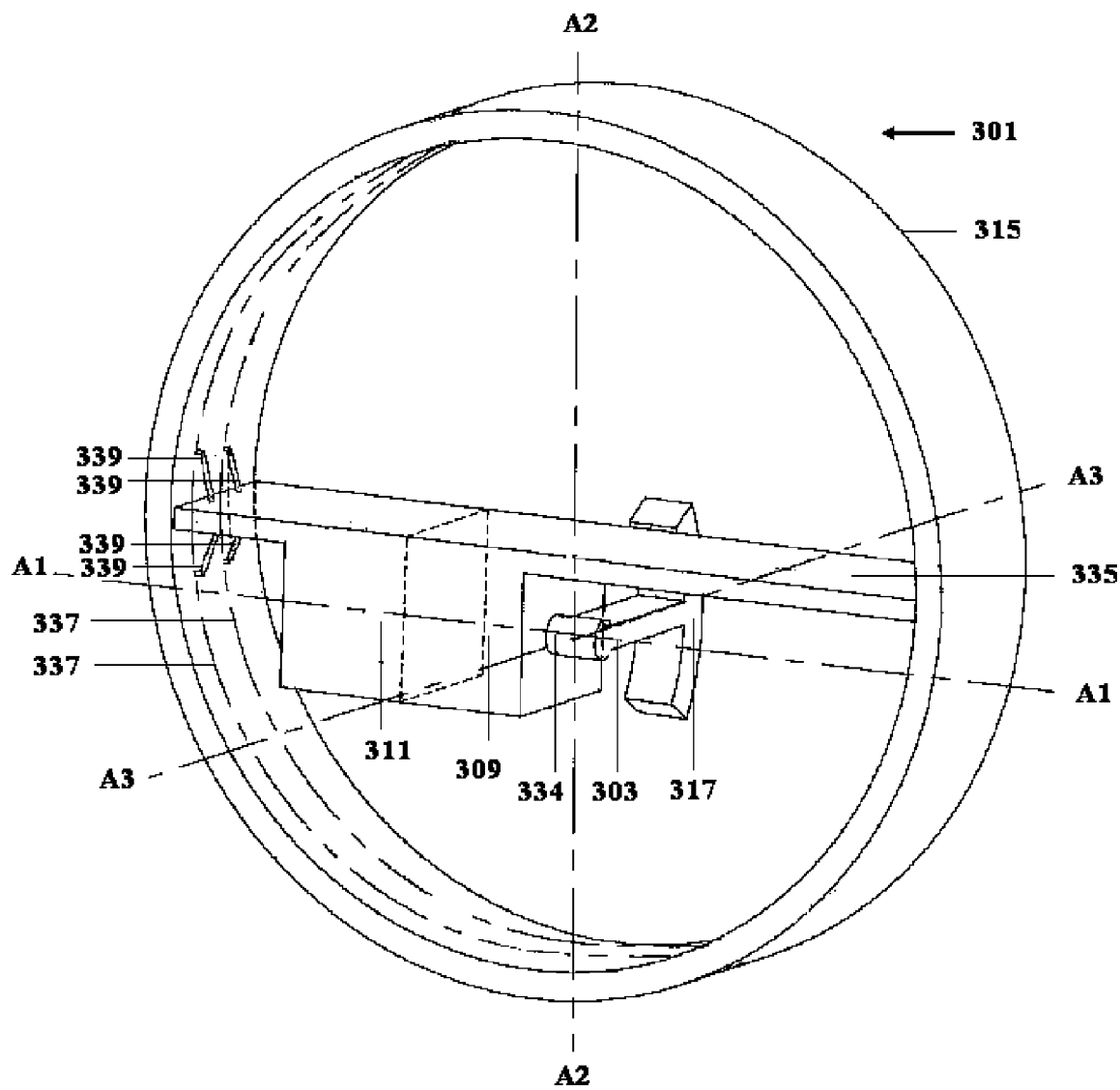
FIG. 11(a) is a schematic diagram showing a multiaxis inertia driven energy harvester.
Figure 11B:
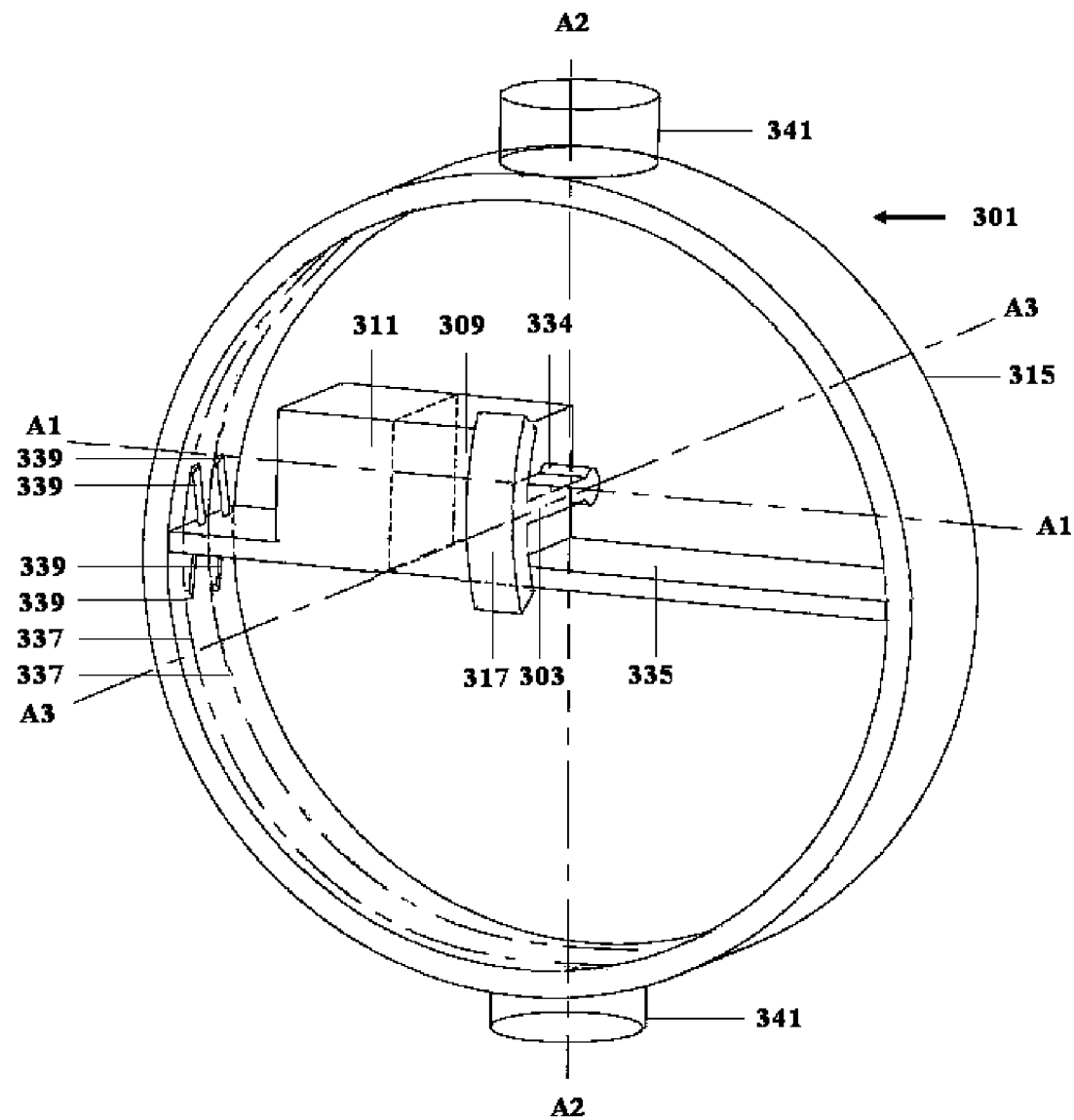
FIG. 11(b) is a schematic diagram showing another embodiment of multiaxis inertia driven energy harvester.

Optionally, energy harvester 301 can include a second housing. As shown in FIG. 1(*b*), first housing 315 can have one, preferably at least two, connectors 341. In an exemplary embodiment, connectors 341 can be any indentation, protrusion, latch, notch or fastener that can be coupled to an external second housing with a pair of mating connectors, such as any protrusions, indentations, latches, notches or fasteners. Second housing can have an annular or spherical shape. In an exemplary embodiment, first and second housing form a gyroscope like configuration. Connectors 341 and corresponding mating connectors of the second housing enable second housing to rotate at least in one direction relative to axis A2 about first housing 315, thereby enabling first housing 315 to rotate about axis A2. In one embodiment, second housing can be filled with a fluid or can include other dampening mechanisms to optimize the capture of inertial forces and ambient motion. As shown in FIG. 11(*b*), arm 303 can be free to rotate about an axis A1, base member 335 can rotate about axis A3 and first housing 315 can be rotate about axis A2, enabling free three dimensional movement and allowing energy harvester 301 to fully capture the kinetic energy of a surrounding environment due to any directional motion. In a another exemplary embodiment, arm 303, generator 311 and/or gearing system 309 of FIG. 11(a)-11(b) can be positioned on or attached to a balled, pivoted or jointed surface rather than base member 335 to enables two or more, preferably three or more, degrees of rotional freedom. In this embodiment, the movement of the balled, pivoted or jointed surface induces misalignment of arm 303 relative to the original attachment plane. The balled, pivoted or jointed surface can be actively or passively be induced to realign the swing axis of arm 303 in an optimal direction and/or plane that maximizes the acceleration of and energy generation of arm 303. In one embodiment, the swing axis can be actively realigned actively using a servo or electromechanical device which would cause the inertial energy harvester 301 to pivot about an axis. The optimal plane or direction can be determined using accelerometers or other inertial sensing device. Alternatively, the realignment can be passively induced by introducing friction/dampening forces into the balled, pivoted or jointed system. By varying the resistance or friction of the balled, pivot or jointed system, the system automatically and adjustably realigns itself to the most advantageous swing-plane and/or can adjust its ability to prevent secondary vibration of the system.

It is envisioned that the various energy harvester embodiments of the present invention or components thereof can be combined to enhance capture of kinetic energy from multiple forms of motion. For example, multi-axis energy harvester 301 can be modified to include any of the suspension systems 5 or arm configurations 3 of energy harvester 1 or 201 to capture kinetic energy produced by different types of motion. Alternatively, one or more embodiments of energy harvester 1 may be attached to the base member 335 of multi-axis energy harvester 301.

In an exemplary embodiment, each of the aforementioned inertia induced energy harvesters can be anchored to, strapped to, mounted on or otherwise attached to a person or animal to efficiently harness the ambient kinetic energy created by movement of the person or animal, such as by walking, jogging or running. For example, it is envisioned that the inertia induced energy harvester can be strapped to an animal's or person's clothing or accessory or body part, such as an arm, leg or neck. In an exemplary embodiment, the energy harvester is adapted to be attached to an arm band, wrist band, wrist watch or belt. In another embodiment, the inertia induced energy harvesters can be strapped to an animal collar, identification tag or leash. The energy harvesters of the present invention can be attached to or positioned on any movable surface or structure movably responsive to an applied force, such as a buoy, to capture its kinetic energy. Alternatively, the energy harvesters can be mounted to a stationary surface that is exposed to natural forces, such as wind and fluid flow. For example, the energy harvester can be positioned on any transportation means, such as a watercraft, aircraft, motor vehicle or train, trees, swaying buildings, poles, wind turbines, the sails of a boat, surfaces encountering turbulence or resistance, devices buffeted by either water or wind, such as windshields or vehicle coverings, windsocks, flags or pennants or any machine or object powered by motors that generates vibrations. It is envisioned that the invention may be particularly useful when incorporated in a tracking device for locating and data logging the movements of animals, people, or property In addition to powering an electrical device, the invention can be used to replace batteries or provides a means for recharging batteries.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. An inertia driven energy harvester comprising:
   a housing;
   a first arm comprising a body, said first arm coupled to said housing via a hinge connection permitting said first arm to swing responsive to a force of a surrounding environment from movement of the housing;
   a first mass attached to said first arm to swing with said first arm responsive to the force of the surrounding environment;
   a bumper that restricts the motion of said first arm as it swings;
   a first spring coupled to said housing and to an upper surface of said first arm to suspend said first arm from said housing, wherein said first spring has a spring rate of about 0.01 Nm/Deg to about 5.0 Nm/Deg adapted for capturing low frequency vibrations of said surrounding environment from the movement of the housing;
   a gearing system connected to said first arm for transferring a kinetic energy of said first arm as it swings; and
   a generator connected to said gearing system for transforming said kinetic energy transferred by the gearing system to the generator into electricity.

2. The energy harvester of claim 1, further comprising an energy storage device for storing said generated electricity.

3. The energy harvester of claim 1, wherein a length of said body, at an initial rest position, is substantially perpendicular to a direction of gravity.

4. The energy harvester of claim 1, wherein said arm is capable of moving in response to said force of said surrounding environment in three or more directions and wherein said movement is selected from the group consisting of: twirling, twisting, bobbing, tapping and combinations thereof.

5. The energy harvester of claim 1, wherein said energy harvester comprises a second arm and second mass.

6. The energy harvester of claim 5, wherein a first length of said first arm is different than a second length of said second arm.

7. The energy harvester of claim 5, wherein a first weight of said first mass is different than a second weight of said second mass.

8. The energy harvester of claim 1, further comprising two fasteners positioned on said housing or said first arm for adjustably positioning said first spring on said housing or said first arm.

9. The energy harvester of claim 1, wherein an end of said first spring is capable of sliding along a length of said body or said housing.

10. The energy harvester of claim 9, wherein said arm or said housing comprises a guide rail and a slidable member and wherein an end of said first spring is attached to said slidable member.

11. The energy harvester of claim 1, further comprising a second spring attached at one end to a lower surface of said first arm and attached at a second end to said housing.

12. The energy harvester of claim 11, further comprising a third spring attached to said first arm and a fourth spring attached to said first arm, wherein a first spring rate of said third or said fourth spring is higher than a second spring rate of said first spring or said second spring.

13. The energy harvester of claim 12, wherein said third spring and said fourth spring are angular spaced apart relative to one another by about 5° to about 25°.

14. The energy harvester of claim 11, wherein the first and second springs cooperate to set an initial rest point for the first arm and first mass, and wherein the energy harvester includes a pair of bumpers positioned to redirect the arm and first mass back toward the initial rest point.

15. The energy harvester of claim 1, wherein the gearing system is configured to translate the kinetic energy of the first arm into rotational movement in the gearing system for use by the generator in generating electricity.

16. An inertia driven energy harvester comprising:
a housing;
an arm rotationally coupled to said housing to permit said arm to rotate responsive to a force of a surrounding environment from movement of the housing;
a mass attached to said arm to rotate with said arm responsive to the force of the surrounding environment;
a spring coupled to said housing and to an upper surface of said arm to suspend said arm from said housing;
a gearing system connected to said arm for transferring a kinetic energy of said arm as it rotates; and
a generator connected to said gearing system for transforming said kinetic energy transferred by the gearing system to the generator into electricity, wherein said generator is operable as a motor to provide an initial driving force to said arm to induce movement of said arm from an initial rest position.

17. The energy harvester of claim 16, further comprising a bumper attached to said housing for restricting movement of said mass, wherein said bumper comprises a spring or magnetic element.

18. The energy harvester of claim 17, wherein said bumper is removably attached to and adjustably positioned on said housing.

19. The energy harvester of claim 17, wherein said bumper is an electromagnetic element operatively associated with a control for adjusting the resistive force of said bumper during operation of said energy harvester.

20. The energy harvester of claim 17, wherein said bumper has a variable spring rate.

21. The energy harvester of claim 16, further comprising an accelerometer and microcontroller.

22. The energy harvester of claim 16, further comprising an energy storage device for storing said electricity.

* * * * *